J. M. PAYNE.
Plows.
No. 149,515. Patented April 7, 1874.
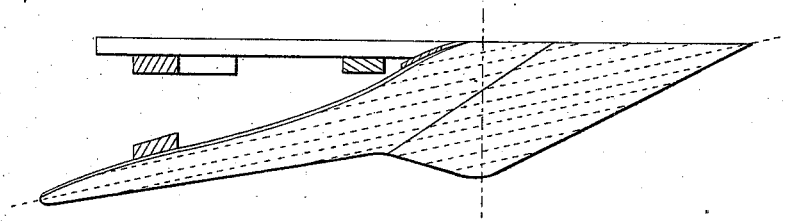
Fig. 2.
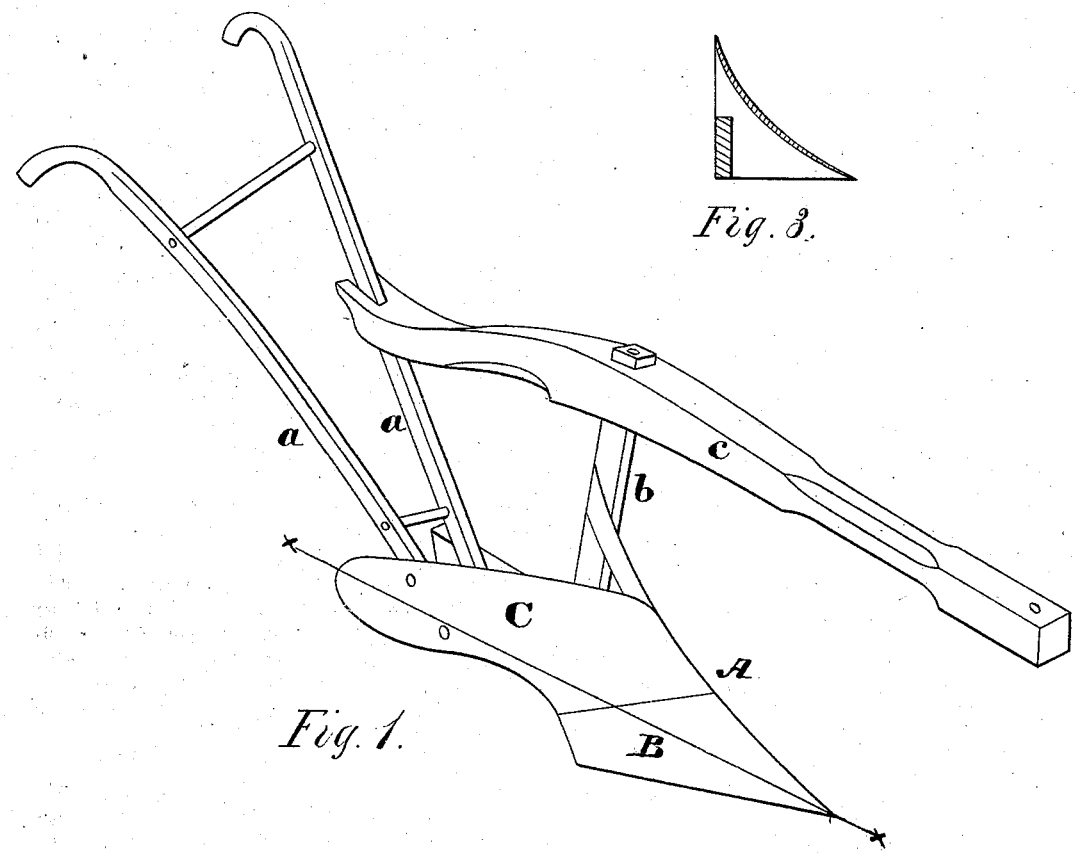
Fig. 3.
Fig. 1.
Witnesses.
Phil. C. Masi.
E. A. Bates.
Inventor.
Jos. M. Payne.
Chipman, Hosmer & Co
Attys

UNITED STATES PATENT OFFICE.

JOSEPH M. PAYNE, OF BIRDVILLE, TEXAS.

IMPROVEMENT IN PLOWS.

Specification forming part of Letters Patent No. 149,515, dated April 7, 1874; application filed August 30, 1873.

*To all whom it may concern:*

Be it known that I, JOSEPH MOTT PAYNE, of Birdville, in the county of Tarrant and State of Texas, have invented a new and valuable Improvement in Plows; and I do hereby declare that the following is a full, clear, and exact description of the construction and operation of the same, reference being had to the annexed drawings making a part of this specification, and to the letters and figures of reference marked thereon.

Figure 1 of the drawings is a representation of my improved plow. Fig. 2 is a section, showing formation of mold-board. Fig. 3 is a sectional detail of same.

This invention relates to an improvement on plows which are especially designed for turning the black land found in the State of Texas, which is very difficult to work with the well-known turn-plows, on account of its tenacious and heavy properties. The object of my invention is to construct a plow which shall present a right line from its point to its heel, and a gentle curve transversely, which curve becomes more and more vertical as it approaches the rear termination of the mold-board, so as to lift the slice and turn it with the least possible amount of friction and expenditure of power.

In the annexed drawings, A represents the land-side of the plow, B the share, and C the mold-board. The handles *a a*, the standards *b*, and beam *c* may be constructed in the usual well-known manner for turn-plows.

The peculiarities of this plow are as follows: It presents right lines from the point of the share to the rear narrow extremity of the wing of the mold-board, as indicated by the line *x x*, and the dotted lines *x x*, which are parallel thereto. If the mold-board be taken horizontally it presents a gentle curve from its cutter-edge back to its rear extremity, which curve is convex toward the slice-turning side. If the share and the mold-board be taken transversely at any point, their slicing-surface is concave.

This plow is long and narrow, and the angle formed by the cutting-edge of its share and its land-side is about thirty degrees, which is ten degrees less than in any other plow with which I am acquainted. From the rear edge of the share back to the rear end of the mold-board, the transverse curve diminishes gradually, and becomes more and more vertical, so that the rear end of the mold-board is nearly in a vertical plane; hence the friction on this board gradually diminishes as the slice is turned.

A plow constructed in this manner will turn the slice, when passing through the black soil referred to, with very little friction, and will leave the slice smooth and unbroken, owing in part to the extreme acuteness of the entering point to the right-line surface, and also to the transverse curve, diminishing gradually in concavity and inclination from point to heel.

What I claim as new, and desire to secure by Letters Patent, is—

A black-land plow having a long and narrow mold-board and share, presenting right lines from its point to its heel, and a gentle curve transversely, said curve becoming more vertical as it approaches the rear end of the mold-board, as and for the purpose mentioned.

In testimony that I claim the above I have hereunto subscribed my name in the presence of two witnesses.

JOSEPH MOTT PAYNE.

Witnesses:
A. ALLEN,
J. L. ADAMS.